(12) United States Patent
Al-Dulaimi et al.

(10) Patent No.: US 12,245,054 B2
(45) Date of Patent: Mar. 4, 2025

(54) INJECTING ANALYTICS INTO NETWORK REPOSITORY FUNCTION (NRF) FOR AUTOMATED MANAGEMENT OF 5G CORE

(71) Applicant: EXFO Solutions SAS, Saint-Jacques-de-la-Lande (FR)

(72) Inventors: Anwer Al-Dulaimi, Montréal (CA); Stéphane Lagain, Rennes (FR); Sylvain Nadeau, Vaudreuil-Dorion (CA)

(73) Assignee: EXFO Solutions SAS, Saint-Jacques-de-la-Lande (FR)

( * ) Notice: Subject to any disclaimer, the term of this patent is extended or adjusted under 35 U.S.C. 154(b) by 342 days.

(21) Appl. No.: 17/721,420

(22) Filed: Apr. 15, 2022

(65) Prior Publication Data
US 2022/0345913 A1    Oct. 27, 2022

Related U.S. Application Data

(60) Provisional application No. 63/177,647, filed on Apr. 21, 2021.

(51) Int. Cl.
*H04W 24/02*    (2009.01)
*H04W 24/08*    (2009.01)
*H04W 48/16*    (2009.01)

(52) U.S. Cl.
CPC .......... *H04W 24/02* (2013.01); *H04W 24/08* (2013.01); *H04W 48/16* (2013.01)

(58) Field of Classification Search
CPC ... H04W 76/50; H04W 76/11; H04W 64/006; H04W 76/27; H04L 5/0048; H04L 69/22
See application file for complete search history.

(56) References Cited

U.S. PATENT DOCUMENTS 9,838,272 B2   12/2017 Djukic et al.
10,505,870 B2   12/2019 Cui et al.
(Continued)

FOREIGN PATENT DOCUMENTS

WO   2015/065368 A1   5/2015
WO   2018215046 A1   11/2018
(Continued)

OTHER PUBLICATIONS

Hunt et al., "End-toEnd Network Service Lifecycle Demonstration," IEEE Conference on Network Function Virtualization and Software Defined Networks 2015 Demo Track, pp. 9-12.
(Continued)

*Primary Examiner* — Iqbal Zaidi
(74) *Attorney, Agent, or Firm* — Baratta Law PLLC; Lawrence A. Baratta, Jr.; Ryan Odessa

(57) ABSTRACT

Systems and methods for managing 5G networks are provided. A method for injecting analytics into a Network Repository Function (NRF) for managing a 5G slice, according to one implementation, includes a first step of obtaining parameters associated with User Plane (UP) traffic and Control Plane (CP) traffic from a Service-Based Architecture (SBA) of a 5G network. The method also includes the step of performing analytics on the obtained parameters to monitor Network Functions (NFs) associated with the 5G network. In addition, the method includes the step of providing results of the analytics to an NRF to control NFs stored in a repository associated with the NRF.

16 Claims, 12 Drawing Sheets

(56) References Cited

U.S. PATENT DOCUMENTS

| | | | |
|---|---|---|---|
| 10,581,984 | B2 | 3/2020 | Livanos et al. |
| 10,785,634 | B1 | 9/2020 | Fiorese et al. |
| 10,841,974 | B1 | 11/2020 | Young et al. |
| 10,892,958 | B2 | 1/2021 | Bor-Yaliniz et al. |
| 10,911,326 | B2 | 2/2021 | Han et al. |
| 11,653,178 | B2 * | 5/2023 | Qiao .................. H04W 4/026 455/456.3 |
| 11,729,636 | B1 * | 8/2023 | Ahmed ................ H04W 24/02 370/254 |
| 2012/0317276 | A1 | 12/2012 | Muniraju |
| 2018/0262924 | A1 | 9/2018 | Dao et al. |
| 2018/0367373 | A1 | 12/2018 | Chou |
| 2019/0109768 | A1 | 4/2019 | Senarath et al. |
| 2019/0215730 | A1 | 7/2019 | Qiao et al. |
| 2019/0222489 | A1 | 7/2019 | Shan et al. |
| 2019/0253917 | A1 | 8/2019 | Dao et al. |
| 2019/0268777 | A1 | 8/2019 | Simon et al. |
| 2019/0356558 | A1 | 11/2019 | Han et al. |
| 2019/0380037 | A1 | 12/2019 | Lifshitz et al. |
| 2020/0042365 | A1 | 2/2020 | Tanna et al. |
| 2020/0106812 | A1 | 4/2020 | Verma et al. |
| 2020/0112868 | A1 | 4/2020 | Shariat et al. |
| 2020/0112907 | A1 | 4/2020 | Dao et al. |
| 2020/0112921 | A1 | 4/2020 | Han et al. |
| 2020/0296603 | A1 | 9/2020 | Suthar et al. |
| 2021/0021494 | A1 | 1/2021 | Yao et al. |
| 2021/0105665 | A1 | 4/2021 | Bennett et al. |
| 2021/0211452 | A1 | 7/2021 | Patel et al. |
| 2022/0124547 | A1 * | 4/2022 | Young ............... H04W 28/0247 |

FOREIGN PATENT DOCUMENTS

| | | |
|---|---|---|
| WO | 2019196796 | 10/2019 |
| WO | 2019197467 | 10/2019 |
| WO | 2019246530 | 12/2019 |
| WO | 2020001795 | 1/2020 |
| WO | 2020018012 | 1/2020 |
| WO | 2020031158 | 2/2020 |
| WO | 2020032769 | 2/2020 |
| WO | 2020074092 A1 | 4/2020 |
| WO | 2020173580 | 9/2020 |

OTHER PUBLICATIONS

Karapantelakis et al., "DevOps for IoT Applications using Cellular Networks and Cloud," 2016 IEEE 4th ternational Conference of Future Internet of Things and Cloud, pp. 340-347.

Afolabi et al., "Network Slicing and Softwarization: A Survey on Principles, Enabling Technologies, and Solutions," IEEE Communications Surveys & Tutorials, vol. 20, No. 3, Mar. 21, 2018, pp. 2429-2453.

Santos et al., "SELFNET Framework self-healing capabilities for 5G mobile networks," Open Access, DOI: 10.1002/ett.3049, Sep. 30, 2016.

Casellas et al., "Enabling Data Analytics and Machine Learning for 5G Services within Disaggregated Multi-Layer Transport Networks," IEEE, Jul. 1, 2018.

Corici et al., "Practical Performance Degradation Mitigation Solution using Anomaly Detection for Carrier-Grade Software Networks," 2018 IEEE Conference on Standards for Communications and Networking (CSCN), Dec. 20, 2018.

Pateromichelakis et al., "End-to-End Data Analytics Framework for 5G Architecture," IEEE Access, vol. 7, 2019, Mar. 5, 2019, pp. 40295-40312.

Jul. 12, 2022, European Search Report issued for European Patent Application No. EP 22 16 9188.

3GPP, "3rd Generation Partnership Project; Technical Specification Group Services and System Aspects; Study of Enablers for Network Automation for 5G," 3GPP TR 23.791 v1.1.0, Nov. 3, 2018, pp. 1-97.

Nokia et al., "Soution to Key Issue #6: NWDAF analytics usage for UPF selection," 3GPP TSG-SA WG2 Meeting #129, S2-1810737, Oct. 15-19, 2018, 2 pgs.

Tencent et al., "NRF Registration and Discovery Service Update," SA WG2 Meeting #133, S2-1905153, May 13-17, 2019, 5 pgs.

\* cited by examiner

| SERVICE/PARAMETER | DESCRIPTION |
| --- | --- |
| NF LOAD | The average load of the NF instance over the Analytics target period |
| NF PEAK LOAD | The maximum load of the NF instance over the Analytics target period |
| NF RESOURCE USAGE | Average usage of assigned resources (CPU, memory, disk) (average, peak) |
| List of network performance information (1, ..., max) | Predicted analytics during the Analytics target period |

| INFORMATION | DESCRIPTION |
| --- | --- |
| List of resources status (1, ... max) | List of observed load info for each NF instance along with the corresponding NF ID / NF set ID |
| > NF type | Type of the NF instance |
| > NF instance ID | Identification of the NF instance |
| > NF status (see note 1) | The availability status of the NF on the Analytics target period, expressed as a percentage of time per status value (registered, suspended, undiscovered) |
| > NF resource usage (see note 1) | Average usage of assigned resources (CPU, memory, disk) |
| > NF load (see note 1) | Average load of the NF instance over the Analytics target period |
| > NF peak load (see note 1) | Maximum load of the NF instance over the Analytics target period |
| > NF load (per area of interest) (see note 2) | Average load of the NF instances over the area of interest |

INJECTING ANALYTICS INTO NETWORK REPOSITORY FUNCTION (NRF) FOR AUTOMATED MANAGEMENT OF 5G CORE

CROSS-REFERENCE TO RELATED APPLICATIONS

This application claims the benefit of priority to U.S. Provisional Application No. 63/177,647, filed Apr. 21, 2021.

This application is related to and hereby incorporates by reference the specification of U.S. patent application Ser. No. 17/229,057, filed Apr. 13, 2021.

This application is related to and hereby incorporates by reference the specification of U.S. patent application Ser. No. 17/209,370, filed Mar. 23, 2021.

TECHNICAL FIELD

The present disclosure generally relates to the Network Repository Function (NRF) used in 5G telecommunications networks. More particularly, the present disclosure relates to using a control loop of monitored metrics for managing NRF.

BACKGROUND

In the fifth generation (5G) mobile network, Network Functions (NFs) can be stored in a repository using a Network Repository Function (NRF). For example, the actions associated with NRF are defined in the third generation Partnership Project (3GPP) TS 29.510 and may be considered to be the main management function that maintains the NF repository data and profiles. Thus, 3GPP TS 29.510 defines various actions with respect to interconnecting services, supporting service discovery to determine an NF that fulfills certain criteria (e.g., processing a given service), and assigning NFs in a certain topology for incoming sessions of 5G slices. The NFs on the 5G Core (5GC) framework may each include multiple sub-functions that are interconnected in a mesh model.

Sessions can be assigned to a certain topology of selected sub-NFs. For example, if a request arrives to a first Session Management Function (SMF1) and it is not available, then the request can be forwarded to a second SMF (SMF2), . . . , SMFn+1, and so on, until it finds an available sub-NF. However, this process increases the Round Trip Time (RTT) accumulated during NF discovery and service assignment. Also, NFs are responsible for maintaining their respective repository using the NRF, which too can make the process more time consuming when some of the NFs fail or become overloaded.

FIG. 1 is a diagram illustrating a conventional 5GC Network Function (NF) framework 10 for a 5GC network. The 5GC NF framework 10 utilizes a Network Repository Function (NRF) 12 for managing an associated repository 14 for storing NF actions. The 5GC NF framework 10 includes many smaller NFs that need to register with the NRF 12. Therefore, the NRF 12 maintains a topology inventory 16 and tags such registered NFs as available resources in the repository 14 for any new incoming sessions.

Typically, the NRF 12 assigns a sub-set of core NFs to become the "serving topology" for a certain session. However, one problem that may arise is the fact that some of those NFs might be failing or exhausted with computational resources. Hence, this may cause the session to fail and the NRF 12 will need to re-assign new NFs to "heal" the session. However, this process will increase time delays and will degrade the network performance, which, of course, are not acceptable, especially in time-sensitive communications.

U.S. Pat. No. 10,581,984 provides a mid-stage interface provided between a Network Analytics Discovery Function (NWDF) and an NF Profile Repository Function (NPRF). The interface allows the NRF to retrieve information on request. Also, WIPO Patent WO2020031158 provides full end-to-end service as a whole without the NRF processing individual NF discoveries and status update procedures, such as in 5GC networks. A mechanism is configured for controlling or managing the end-to-end service for User Equipment (UE) as a separate instance and not through the NRF. In the interim, passive probing and other data sources would be used to capture the NF metrics to help NWDAF producing the necessary analytics needed for this application. In the final solution, Ultimately, the NWDAF would consume metrics generated by NFs themselves or really on hybrid model where metrics are obtained from both NFs and other passive monitoring data sources. This design will allow NWDAF a better insight into core NFs status and resource availability.

The current solutions may include load balancing and management capabilities and are configured to define appropriate commands to handle registration and deregistration of NFs. Nevertheless, the conventional systems currently have several disadvantages. Some of the negative impacts of the conventional systems include increased RTT, a large consumption of resources, etc. and may trigger unnecessary Life Cycle Management (LCM) operations. Therefore, there is a need in the field of NRF frameworks in 5GC to overcome the deficiencies of the conventional systems to improve the efficiency of utilizing NFs in 5GC sessions.

BRIEF SUMMARY

The present disclosure is directed to systems and methods for managing 5G slices, particularly to inject monitored parameters or analytics into a Network Repository Function (NRF) to determine if one or more Network Functions (NFs) are faulty or unavailable. If so, the NRF can remove these faulty or unavailable NFs from a corresponding repository, which can lead to more efficient operation of the 5G network.

According to one implementation, a process for managing NFs in a repository associated with a 5GC framework may include a step of obtaining parameters associated with a User Plane (UP), Control Plane (CP), and Service-Based Architecture (SBA) of a 5G network. The process may further include the step of performing analytics on the obtained parameters to monitor Network Functions (NFs) associated with the 5G network. Also, the process may include the step of providing results of the analytics to a Network Repository Function (NRF) to control NFs stored in a repository associated with the NRF.

According to further embodiments, the process can be further defined as follows. For example, the step of performing analytics may be implemented using a Network Data Analytics Function (NWDAF) of the SBA. The process, therefore, may further include the step of allowing the NWDAF to communicate an update request to the NRF. The NWDAF, in some embodiments, may be configured to receive input from one or more of a Network Slice Selection Function (NSSF), a Network Exposure Function (NEF), the NRF, a Policy Control Function (PCF), a Unified Data Management (UDM) function, an Application Function (AF), an Authentication Server Function (AUSF), an Access and Mobility management Function (AMF), and a Session Management Function (SMF).

In some embodiments, the step of providing the results to the NRF may further include the step of utilizing an interface in a control loop, where the interface, for example, may be positioned between a monitoring tool and the NRF. The process may also include configuring the interface to provide one or more alarms to the NRF regarding a status of one or more NFs in the repository. According to some implementations, the step of obtaining the parameters may include the steps of receiving passive results from an UP probe and a CP probe and also receiving native results from an SBA probe of the SBA. The step of performing analytics may include the step of evaluating 5G NF status using Artificial Intelligence (AI). The AI, for example, may be configured to predict errors in one or more NFs in the repository. The process may also include removing one or more faulty or unavailable NFs from the repository.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

FIG. 11 is a table showing analytics available from NFs, according to some embodiments.

FIG. 12 is a table showing data available from NF load analytics, according to some embodiments.

DETAILED DESCRIPTION

The present disclosure relates to Network Repository Function (NRF) frameworks within the fifth generation (5G) telecommunications networks. The present disclosure defines systems and methods related to Network Functions (NFs) associated with NRF to manage a repository of NFs. In particular, conventional systems normally do not remove entries in the repository, which can thereby cause issues, particularly when the size of the repository can cause delay for future 5G sessions and when some NFs are faulty. Therefore, the embodiments of the present disclosure are configured to overcome the issues of the conventional systems by providing NRF systems and methods that can efficiently manage the NF repositories in 5G Core (5GC) networks.

Again, some of the issues with the implementations of the conventional systems are that NFs normally do not remove their entries from the repositories using the NRF. However, the systems and methods of the present disclosure are configured to manage the repositories such that entries can be removed, which is an advantage over previous solutions. Thus, by removing certain entries, such as those that are faulty, can thereby reduce NF discovery time. Also, by removing faulty NFs, certain processing delays can be avoided by the systems and methods of the present disclosure. Therefore, according to the various embodiments described in the present disclosure, the present systems and methods can accurately define the NF topology and reduce the Round Trip Time (RTT) that is normally increased by the conventional systems. Furthermore, the present disclosure can consume fewer resources and trigger fewer unnecessary LCM operations than the conventional systems.

The systems and methods of the present disclosure can predict errors in core NFs and determine whether to create alarms for indicating failures in NFs or the unavailability of NFs. This means that the faulty or unavailable NFs are not assigned to any new sessions and may be excluded from the repository associated with the NRF. For example, the present disclosure defined a new interface that is configured to connect the Network Data Analytics Function (NWDAF), which may include a monitoring solution, with the NRF to transfer such status messages to a Network Exposure Function (NEF). In some cases, the failing, unavailable, or incompetent NFs may be removed from the NRF repository once they are identified by the NWDAF. It may be noted that this feature of the present disclosure does not exist in the 3GPP standard design as there is, as such, no interface between NWDAF to NRF in the conventional systems.

Figure 1:
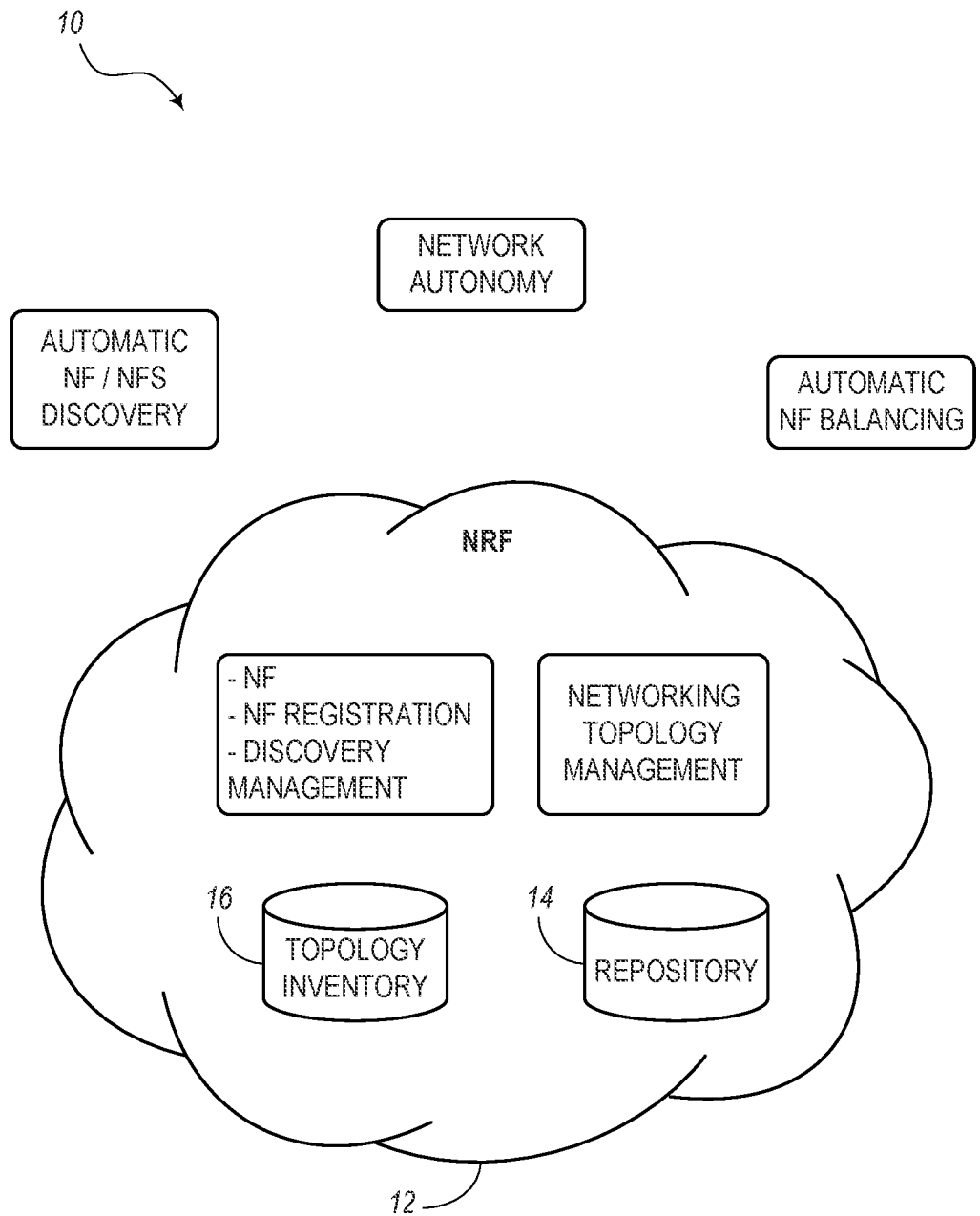
FIG. 1 is a diagram illustrating a conventional Network Function (NF) framework of a Generation 5 Core (5GC).
Figure 2:
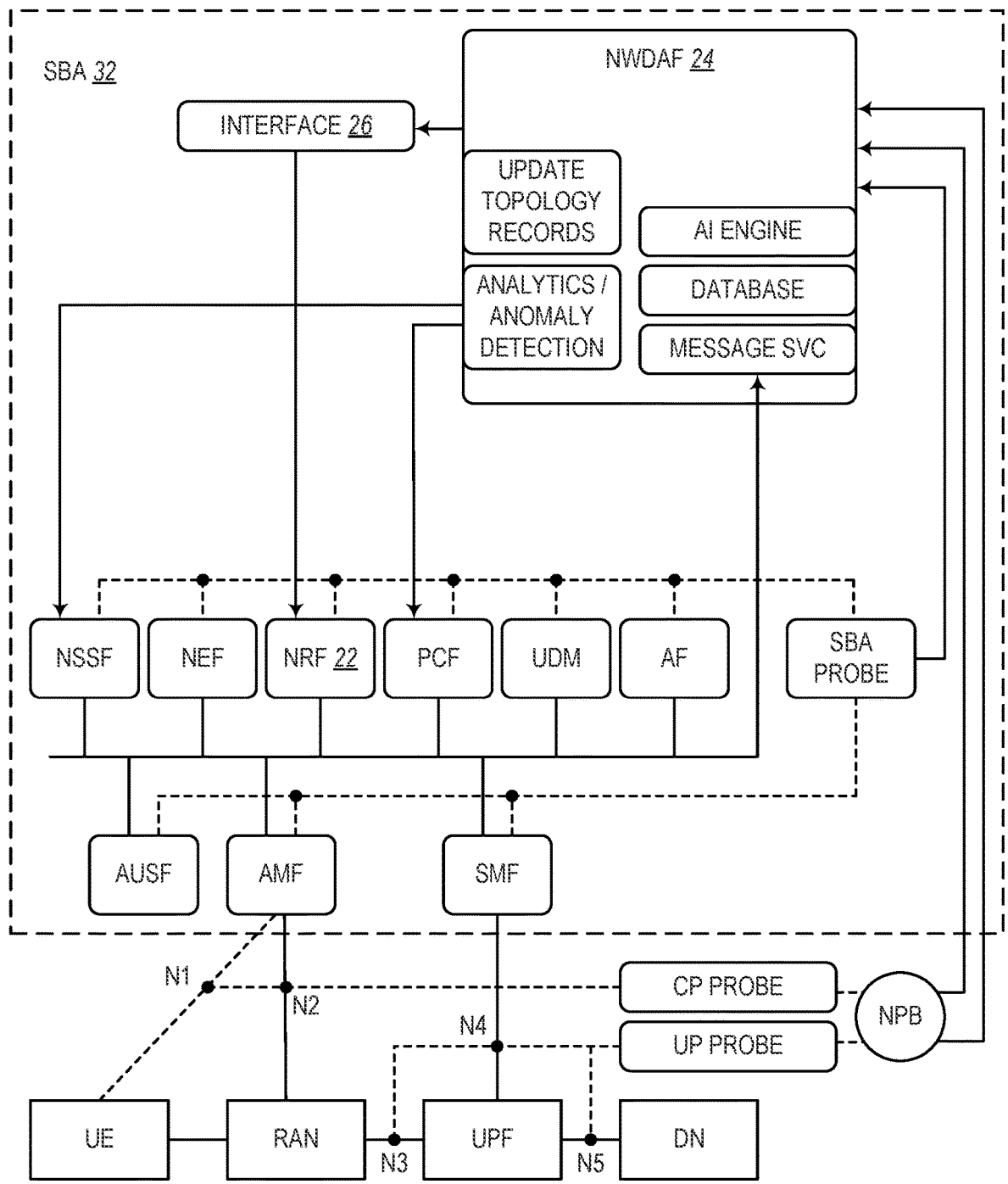
FIG. 2 is a schematic diagram illustrating a first system for managing NFs in a repository in accordance with a Network Repository Function (NRF) of a 5GC framework, according to some embodiments.

FIG. 2 is a schematic diagram illustrating a first embodiment of a system 20 for managing NFs in a repository in accordance with a Network Repository Function (NRF) 22 of a 5GC framework. In this embodiment, the NRF 22 is configured to support the following functions:
  a) maintain the profiles of the available NF instances and their supported services in the 5G core network;
  b) allow consumer NF instances to discover other providers NF instances in the 5G core network;

c) allow NF instances to track the status of other NF instances; and d) support a Service Discovery Function (SDF).

For example, the NRF 22 may maintain the NF profile of available NF instances and their supported services, which it may receive from NFs during a registration procedure. The functionality of the NRF 22 may therefore lead to eliminating the need for network configuration processes every time a new NF is added or removed from the network, or every time the NF capacity is updated due to scale-in or scale-out. In this way, it can greatly reduce operational costs for operators.

The system 20 may be configured within current and/or future analytics systems and methods as well as current and/or future service assurance systems and methods. The processes associated with the system 20 may be integrated with Artificial Intelligence (AI) systems and methods and may use a graphical timeline interface to communicate information to an operator or user. For example, the system 20 may include a Network Data Analytics Function (NWDAF) 24 that may be associated with diverse types of monitoring and analytics processes. The system 20 may further include an interface 24 connected between the NWDAF 24 and the NRF 22. In particular, the interface 26 may be configured to update topology records related to the NRF 22, which may be part of a 5GC Service-Based Architecture (SBA) 32.

From the 5GC perspective, the interface 26 may be configured to:

a) contribute to self-automation of the 5GC SBA 32;

b) improve the SDF of the NRF 22;

c) reduce the time consumed by the 5GC SBA 32 during service assignment; and d) improve 5GC resiliency against sudden NFs failures.

The NWDAF 24 (e.g., along with AI, analytics, and service assurance components) can improve the automation and optimization of 5GC, and can advance anomaly detection to the next level by predicting the status of NFs prior to any service assignment. In addition, the NWDAF 24 can improve the topology discovery functionality of NRF 22 and support compliancy with 5G Key Performance Indicators (KPIs).

Figure 3:
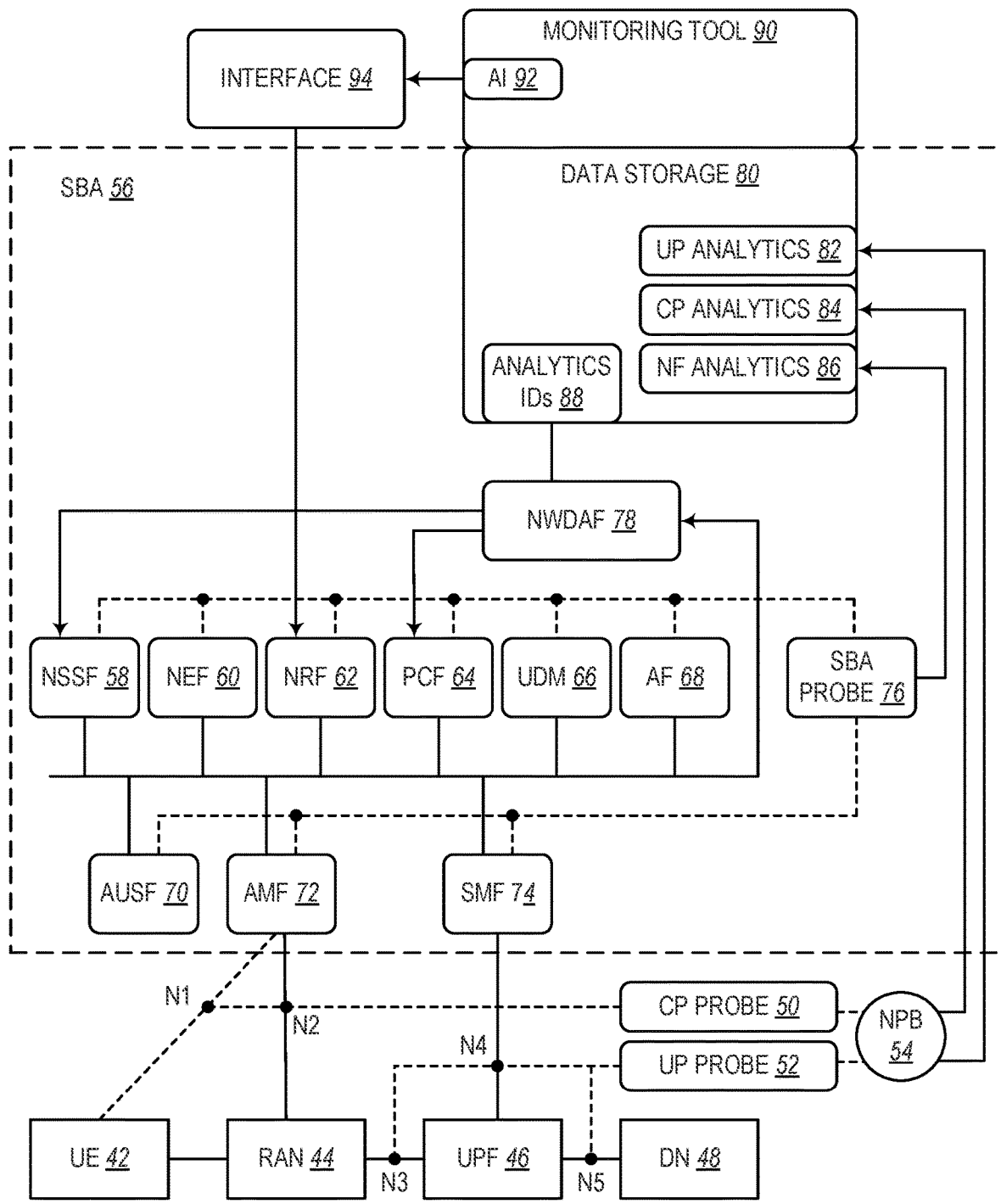
FIG. 3 is a schematic diagram illustrating a second system for managing NFs in a repository in accordance with an NRF of a 5GC framework, according to some embodiments.

FIG. 3 is a schematic diagram illustrating a second embodiment of a system 40 for managing NFs in a repository in accordance with an NRF of a 5GC framework. The system 40 includes many similarities to the system 20 of FIG. 2. In this embodiment, the system 40 includes User Equipment (UE) 42, a Radio Access Network (RAN) 44, a User Plane Function (UPF) 46, and a Data Network (DN) 48. A Control Plane (CP) probe 50 is configured to monitor functions and activities associated with the UE 42 and RAN 44. A User Plane (UP) probe 52 is configured to monitor functions and activities associated with the RAN 44, UPF 46, and DN 48. Metrics obtained by the CP probe 50 and UP probe 52 are provided to a Network Packet Broker (NPB) 54.

The system 40 further includes a Service-Based Architecture (SBA) 56 configured to provide various 5G services. For example, the SBA 56 includes a Network Slice Selection Function (NSSF) 58, a Network Exposure Function (NEF) 60, a Network Repository Function (NRF) 62, a Policy Control Function (PCF) 64, a Unified Data Management (UDM) function 66, an Application Function (AF) 68, an Authentication Server Function (AUSF) 70, an Access and Mobility management Function (AMF) 72, and a Session Management Function (SMF) 74. The AMF 72 of the SBA 56 is connected to the UE 42 and RAN 44. The SMF 74 of the SBA 56 is connected to the UPF 46. An SBA probe 76 is configured to monitor functions and activities of the components 58, 60, 62, 64, 66, 68, 70, 72, 74 of the SBA 56. Furthermore, a Network Data Analytics Function (NWDAF) 78 is configured to receive data regarding the functions and activities of the components 58, 60, 62, 64, 66, 70, 72, 74 of the SBA 56 and provide output to the NSSF 58 and PCF 64.

In addition, the system 40 of FIG. 3 includes a data storage component 80. The data storage component 80 is configured to receive probe information from the NPB 54. For example, the information from the NPB 54 may include User Plane (UP) analytics 82 and Control Plane (CP) analytics 84. The data storage component 80 is also configured to receive probe information from the SBA probe 76, which may include, for example, Network Function (NF) analytics 86. Also, the data storage component 80 is configured to receive analytics IDs 88 from the NWDAF 78. The data storage component 80 is configured to receive and adequately store the monitored information and IDs in any suitable type of database or data store.

The system 40 of FIG. 3 further includes a monitoring tool 90, which is configured to access the information stored in the data storage component 80. In some embodiments, the monitoring tool 90 may include an AI component 92 for executing machine learning models. The AI component 92 may be configured to perform training with existing data in order to create one or more models and then utilize and/or retrain the models as needed with new data obtained in the system 40.

Conventional systems normally do not include any type of control loop with respect to the NWDAF 78, data storage component 80, and/or monitoring tool 90. However, the system 40 of the present disclosure includes an interface 94, which is configured to utilize the results of the monitoring tool 90 (e.g., instructions from the AI component 92) to provide control loop instructions to the NRF 62. In this regard, the control loop allows the management of Network Functions (NFs) with respect to the Network Repository Function (NRF) 62. The repository associated with the NRF 62 may be the data storage component 80 or other suitable repositories for storing NFs. As such, the associated repository may be managed to remove faulty NFs or unavailable NFs, thereby improving the access of the repository by other services.

Figure 4:
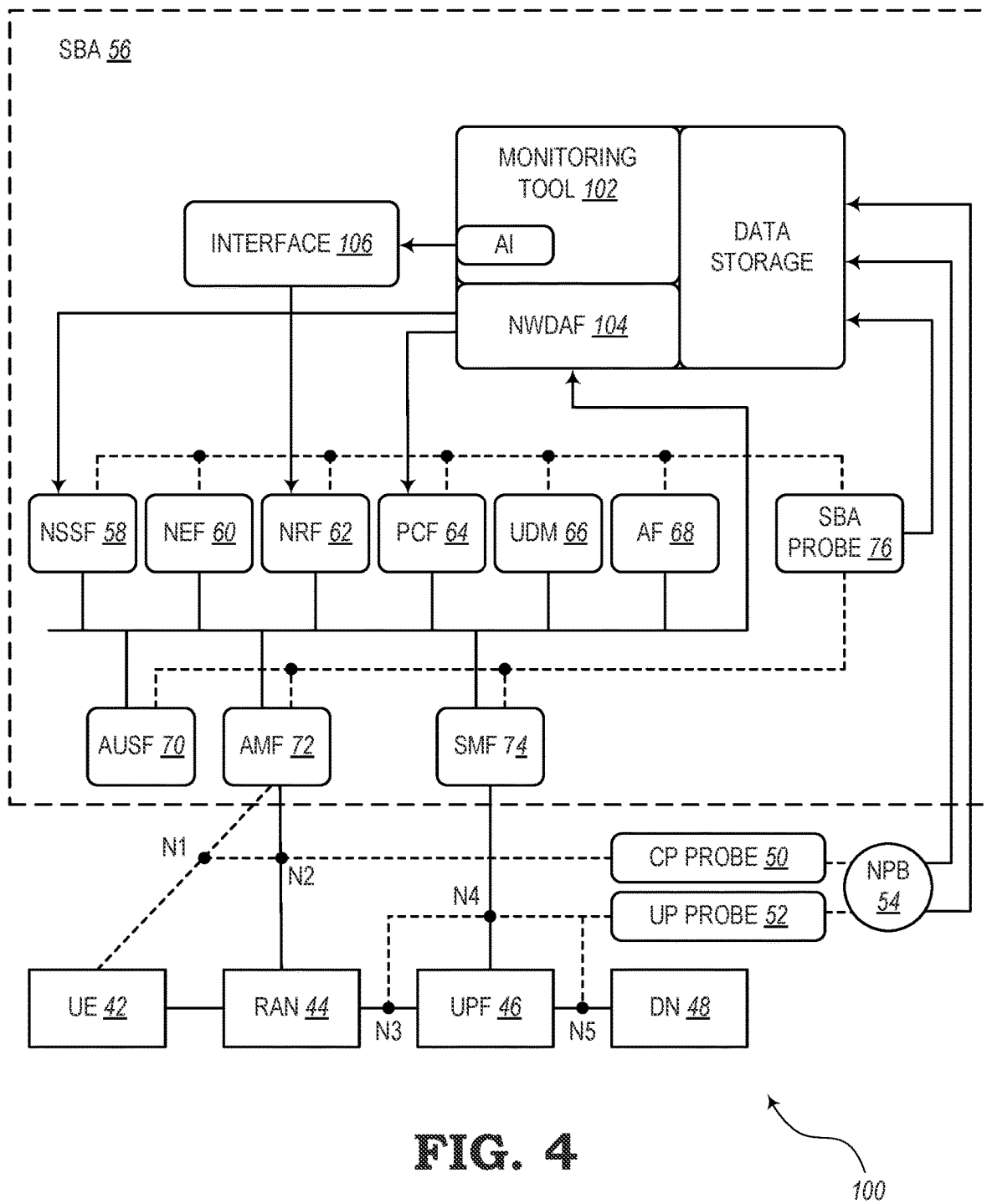
FIG. 4 is a schematic diagram illustrating a third system for managing NFs in a repository in accordance with an NRF of a 5GC framework, according to some embodiments.

FIG. 4 is a schematic diagram illustrating a third embodiment of a system 100 for managing NFs in a repository in accordance with an NRF of a 5GC framework. It may be noted that the system 100 may include many similarities to the system 20 of FIG. 2 and the system 40 of FIG. 3. As shown in FIG. 4, however, the system 100 includes a monitoring tool 102 (e.g., similar to the monitoring tool 90 of FIG. 3), which further includes a NWDAF 104. Again, the NWDAF 104 applies control to the NSSF 58 and PCF 64. The monitoring tool 102 provides a control loop feedback via an interface 106 to the NRF 62.

In this way, the NWDAF 104 is leveraged in a manner that integrates passive probe results. The NWDAF 104 may be used in combination with AI components of the monitoring tool 102. The monitoring tool 102 can evaluate a 5G NF status based on native NWDAF analytics inputs and passive probe counters. Also, the monitoring tool 102 can use various alarms regarding NF status to update a repository or registry controlled by the NRF 62. The interface 106, in this respect, connects the monitoring solution from the monitoring tool 102 with the NRF 62. From a 5GC perspective, the interface 106 will contribute to self-automation of the SBA 56, improve the service discovery functionality of the NRF

62, reduce the time consumed by the SBA 56 during service assignment, and improve 5GC resiliency against sudden NF failures. The monitoring tool 102 can improve the automation of the SBA 56, leverage anomaly detection to the next level by predicting the status of NFs prior to any service assignment, and improve the topology discovery functionality of the NRF 62 to meet 5G Key Performance Indicators (KPIs).

The interface 94, 106 can send the following commands to the NRF 62:
 a) NF_Update—if there is a change in NF status or fluctuations in obtained analytics;
 b) NF_Deregister—to remove a faulty NF from the repository or registry associated with the NRF 62 initiating a "healing" procedures;
 c) NF_Status_Notify—notify the NRF 62 that the repository should not involve certain NFs in service sessions; and
 d) NF_Status_Unsubscribe—when an NF becomes faulty or overloaded.

According to an Architecture Scenario #1: the NWDAF 78, 104 injects analytics into a monitoring solution. Depending on the architecture used by a customer to install the NWDAF 78, 104 in some embodiments, the monitoring tool 90, 102 may develop a NF that subscribes to the NWDAF 78, 104 to request analytics/events. In other embodiments, a host NWDAF outside the SBA 56 can create normal JSON API to access messages.

According to an Architecture Scenario #2: the monitoring tool 102 shown in FIG. 4 is integrated with the NWDAF 104. The monitoring tool 102 can inject analytics messages into monitoring solutions to process analytics and predict NFs that need to be updated on the repository or registry associated with the NRF 52. This allows the SBA 56 to use the monitoring tool 102 to manage and leverage the analytics from the NWDAF 104, evaluate 5G NF status based on native NWDAF analytics inputs and passive probe counters, and interface the monitoring solution with the NRF 62 for fully resilient and automated 5GC.

As such, this can provide certain advantage to a customer. For example, the systems 20, 40, 100 of FIGS. 2-4 are configured to improve the Quality of Experience (QoE) as 5GC will have no delays when assigning sessions to faulty, unavailable, or overloaded NFs. Also, the system 20, 40, 100 are configured to self-maintain and/or heal 5GC NFs using the anomaly detection of the monitoring tool 90, 102, particularly without the need to invoke full Life Cycle Management (LCM) procedures.

In some embodiments, the NWDAF 78, 104 is configured to maintain real-time status of NF availability and processing capabilities. The monitoring tool 90, 102 is configured to analyze topology obtained from the NWDAF 78, 104 and other probes 50, 52, 76 to determine failed or overloaded NFs. Updates to the topology of 5GC can be exported to the NRF 62 as commands to deregister unfunctional NFs. The NRF 62 may thereby update the associated repository or register using predicted 5GC topology and anomaly analysis. The monitoring tool 90, 102 is configured to correlate the NFs with assigned computational resources and with incoming/processed messages.

The systems 20, 40, 100 are therefore configured to learn to create topology to represent all NFs in 5GC. Also, the systems 20, 40, 100 are configured to define the rules for deciding which NFs may not be functional within a certain time frame, create the necessary algorithms that convert alerts into commands to be send over HTTP. The monitoring tool 90, 102 is configured to support NF with TLS1.3 to subscribe to the NRF 62 when it receives messaging commands. It may be noted that the above processes are typically time sensitive.

There are two scenarios that could be.

In Scenario #1 that can be adopted for implementing one solution, the probes 50, 52, 76 and NWDAF 78, 104 may be configured to inject analytics into the monitoring tool 90, 102. Then, the monitoring tool 90, 102 may send commands to the NRF 62. In some embodiments, the solution resides on the same cloud. There might be multiple numbers of NWDAFs on the same platform (e.g., a NWDAF for each slice, dedicated NWDAFs for certain sets of analytics, etc.). Scenario #1 may be considered less complicated in industrial deployments. The monitoring tool 90, 102 can be an analytics system for a service assurance platform.

Further with respect to Scenario #1, the interface 94, 106 is configured between the monitoring tool 90, 102 and the NRF 62. The interface 94, 106 may be configured to inject decisions from the monitoring tool 90, 102 into the NRF 62. Commands may include a) NF_Deregister, b) NF_Register, c) NF_Remove_Profile, etc. Some types of sensors may be used for TLS1.3 decryption.

In Scenario #2 that can be adopted for implementing another solution, the monitoring tool 102 can be embedded with the NWDAF 104, as illustrated in FIG. 4. The interface 106 in this embodiment may be configured to inject decisions of the monitoring tool 102 into the NRF 62. Commands may include A) NF_Deregister, b) NF_Register, c) NF_Remove_Profile, etc. The monitoring tool 102 may have an Integrated Function that can be supported by AI and Big Data on the backend. In Scenario #2, the monitoring tool 102 may be integrated with the NWDAF 104 to process events and create commands to the NRF 62. The Network Packet Broker (NPB) 54 may be configured to collect data from the passive CP probe 50 and passive UP probe 52, as illustrated in FIG. 3.

Regarding the functionality of the NRF 62, the NRF 62 is configured to act as the 5G SBA 56 entity that maintains the repository or registry of the 5G NFs along with their profiles. The NRF 62 is configured to employ service discovery function to determine available NFs when a request arrives from an end user to establish a service session. In some systems, the NRF may rely on different 5G NFs to subscribe and register themselves and invoke a list of services based on registered NFs.

The NWDAF 78, 104 may be configured to integrate the monitoring solution with NWDAF functions. The NWDAF 78, 104 may be configured to create convergent Call Detail Records (CDRs) that include passive probe counters and NWDAF analytics to report NFs status, load, fault occurrence, events, etc. Then, the systems 20, 40, 100 may use AI functionality to train analytics and determine decisions about NFs.

The monitoring tool 90, 102 is configured to send the following commands to the NRF 62:
 a) NF_Update—if there is a change in any NF status or fluctuations in obtained analytics;
 b) NF_Deregister—to remove a faulty NF from the NRF registry while initiating a "healing" procedures;
 c) NF_Status_Notify—notify the NRF 62 to exclude a certain overloaded NF from future session assignments; and
 d) NF_Status_Unsubscribe—when an NF becomes faulty or idle.

In some embodiments, the interface 94, 106 may be configured to connect the monitoring solutions with the NRF 62. The interface 94, 106 may use a JSON-type message using the HTTP protocol. Commands exchanged may follow 3GPP TS 29.510. TLS1.3 encryption may also be used on the interface 94, 106 to comply with ETSI TS 133 501. In some cases, a new NF may need to be created on the monitoring solution side.

According to some embodiments, the monitoring tool 90, 102 may be configured to improve root cause detection by correlating the passive probe counters with relevant Analytics IDs (e.g., obtained from the NWDAF 78, 104). The systems 20, 40, 100 may create new columns for each 5GC NF that shows events occurrence, failure occurrence, load status, etc. The systems 20, 40, 100 may also reflect vendor analytics from the NWDAF 78, 104 along with passive probe analytics. These analytics may then be processed using AI to create predictions, conclusions, alarms, etc. Big Data can also be used to store events from the NWDAF 78, 104 to reduce a footprint for customers. This may also allow the solution better access to NWDAF messaging history.

The systems 20, 40, 100 can also provide a framework to provide certain solutions with respect to repository management. Analytics may be provided by NFs to the NWDAF 78, 104 as specified in ETSI TS 129 520. Then, the AI may use those analytics along with data from the CP probe 50 and UP probe 52. The systems 20, 40, 100 may be configured to align with vendors' specific domains (e.g., multiple NWDAFs). Analytics may be captured from individual NFs on the SBA 56 using any suitable probes, such as for TLS1.3 decryption.

Conventionally, NFs on 5G core framework provide real-time status through messaging service SBA interfaces. The NFs may include multiple smaller sub-functions that are interconnected in a mesh model. This may cause RTT during NF discovery and service assignment. Also, NFs are usually responsible for maintaining their own registry with the NRF, making it more time-consuming when some of those NFs fail or become overloaded. If errors or delays occur in core NFs, they should no longer be assigned sessions by the NRF and should be excluded from the NF repository of NRF. Therefore, according to the embodiments of the present disclosure, these problematic NFs can be removed by the NRF to avoid interruption of efficient operation. Since conventional NRF may have issues deregistering themselves if they are already overloaded, the embodiments of the present disclosure may be configured to trigger an alarm for indicating failed or unavailable NFs. Hence, the interface 94, 106 of the present disclosure are configured to allow the NRF 62 to deregister failing or overcommitted NFs.

According to some embodiments, one process may include the following steps:
1) Provide an analytics engine, which may have an interface in communication with the NRF and may be adapted to exchange commands with NFs on the network on the SBI interface;
2) Capture, by the analytics engine, the usual metrics that are generated by the NFs, including for example: NF load, NF peak load, NF resource usage, list of network performance information, list of resource status, NF type, NF instance ID, NF status, NF resource usage, NF load (per area of interest), N(amf) Event Exposure, mean usage of virtual CPU, memory, disk, etc.;
3) Determine, by the analytics engine, a NF availability for the NFs on the network using the usual metrics, the NF availability including one of failing, overcommitted, working, unknown status;
4) Select a network action for the specific NF for which the NF availability is determined; and
5) Output a network action proposal communication.

This process may further include an optional step of issuing a standard-compliant command based on the network action proposal communication and addressed to the NRF, on the SBI interface, the command being one of the following: a) Update, b) Deregister, c) Status_Notify, d) Status_Unsubscribe, etc.

The process may further include an optional step of obtaining extended datasets providing additional information about the network, wherein the step of determining the NF availability may include combining said extended datasets with the usual metrics to determine the NF availability. For example, counters, KPIs, and metrics, which can be part of the extended datasets, may include Attempts Count, Average Latency (ms), Failure Cause Count, Latency Count, Latency Sum, No_Response Count, Success Count, Timeout Count, Procedure failure (%), Procedure success (%), Procedure No_Response (%), Procedure Timeout (%), etc. In one embodiment, the optional step of obtaining extended datasets may include triggering active tests on the network to be carried out by test agents and adding results of the active tests to the extended datasets.

The process may also include an optional step of predicting a future NF availability for the NFs on the network using the NF availability, the usual metrics and, optionally, the extended datasets. The step of selecting a network action may then include considering the future NF availability in addition to the NF availability. The future NF availability would be a status expected to occur within a specific timeframe.

In some embodiments, the analytics engine may be embedded in an improved NWDAF, provided as a network function on the same network, provided as an external data source that feeds data to the NWDAF or provided as a standalone unit that provides the network action proposal communication to an operator or another network system.

Figure 5:
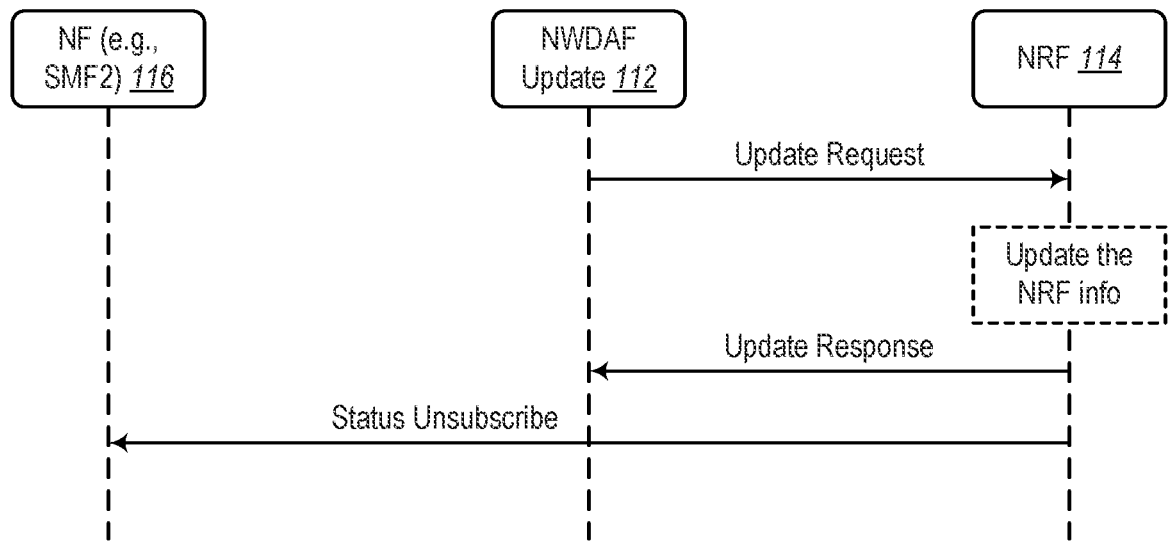
FIG. 5 is a functional chart showing an update function using one of the systems of FIGS. 2-4, according to some embodiments.

FIG. 5 is a functional chart 110 showing an implementation of an update function using one of the systems of FIGS. 2-4. The NWDAF 112 provides an update request to the NRF 114. The NRF 114 may then update the NRF information. Then, the NRF 114 may provide an update response back to the NWDAF 112 and may also provide a NF_Status_Unsubscribe message to the NF 116 (e.g., SMF2).

In some embodiments, commands may need to be encoded into HTTP/2 API, which can carry those messages according to the standard format. The interface 94, 106, in some cases, may use JSON type messages that use the HTTP protocol. Exchanged commands may follow 3GPP TS 29.510. TLS1.3 encryption may be used on the interface to comply with ETSI TS 133 501.

Message received from the NWDAF may need to carry the NF ID and inject data directly into the NRF repository. It can perform an update to the current NF status. For example, the NWDAF 78, 104 may trigger a NF removal from NRF repository and the NRF 62 may unsubscribe that NF. The message may also be sent to the NF (e.g. SMF2), which may also include adding new message information to existing messaging services to accommodate such processing.

Figure 6:
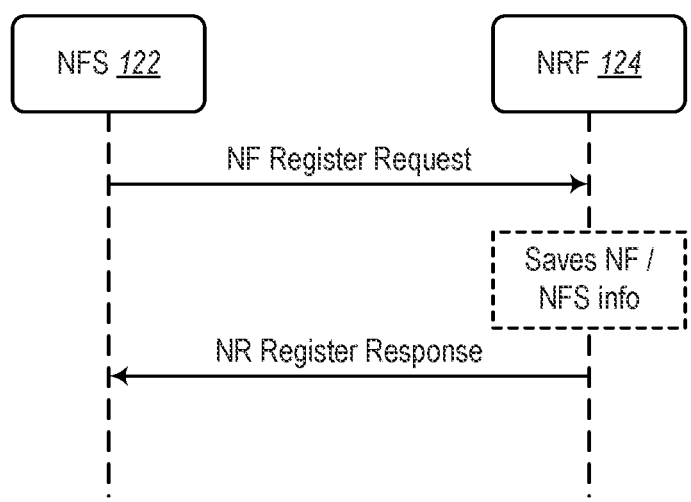
FIG. 6 is a functional chart showing a register function using any NF framework of a 5GC, according to some embodiments.

FIG. 6 is a functional chart 120 showing an implementation of a register function using any NF framework of a 5GC. As shown, the NF Service (NFS) 122 sends an NF_Register_Request to the NRF 124. In response, the NRF 124 saves the NF and other information related to the NFS 122. Then, the NRF 124 sends an NF_Register_Response back to the NFS 122. For NFs operations on any NF, the systems may perform NF Registration. On a 5GC network, the NRF 124 may be responsible for automatic management of all NFs and/or NFS information, including NF registration. NF registration in this regard may be used when an NF becomes operative for the first time and has to register with the NRF 124.

Figure 7:
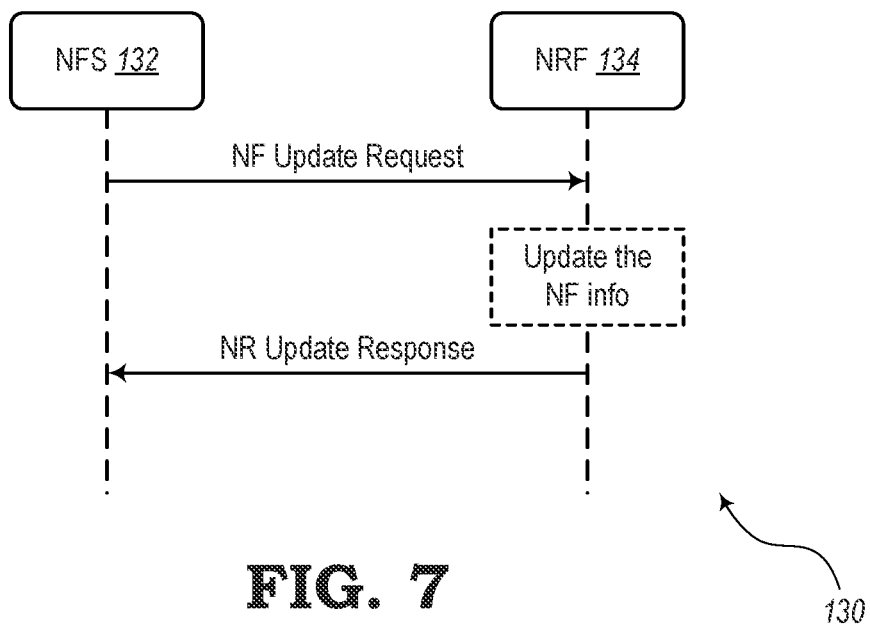
FIG. 7 is a functional chart showing an update function using any NF framework of a 5GC, according to some embodiments.

FIG. 7 is a functional chart 130 showing an implementation of an update function using any NF framework of a 5GC. The Network Function Service (NFS) 132 is configured to send an NF_Update_Request to the NRF 134, which then updates the NF information. Also, the NRF 134 sends an NF_Update_Response back to the NFS 132. Thus, for NF Update on a 5GC network, the NRF 134 may be responsible for automatic management of NFs and/or NFS information, including NF/NFS updates. NF updates may be used when the registered NF/NFS profiles changes. These profiles, for example, may include NF capability update through software upgrades, NFS addition, NF status change, NF-serving slice change, and changes to the NF accessible authorization scope. NRF updates may be classified as full update or partial update.

Also, in some cases, the NRF 134 may issue a "NF Heartbeat Procedure." The NRF 134 may update the heartbeat period of the registered NF by adding a new heartbeat period (e.g., configured by running commands) to the heartbeat response message of the NF. This procedure may be similar to the NF update procedure. In some cases, the request may be structured as "Nna_NF_Management_NF_Update."

According to some implementations, an update result may include, upon a complete update success, the NRF 134 may return a "200 OK" message, and the payload body of the PUT response message may include a representation of the replaced resource. The PUT response message may contain the NF_Profile structure. If the complete update of the NF instance fails due to errors in the encoding of the NFProfile JSON object, the NRF 134 is configured to return the status code "400 Bad Request" with Problem_Details (e.g., error details). If the complete update of the NF instance fails due to NRF internal errors, the NRF 134 is configured to return the status code "500 Internal Server Error" with the Problem_Details (e.g., error details).

Figure 8:
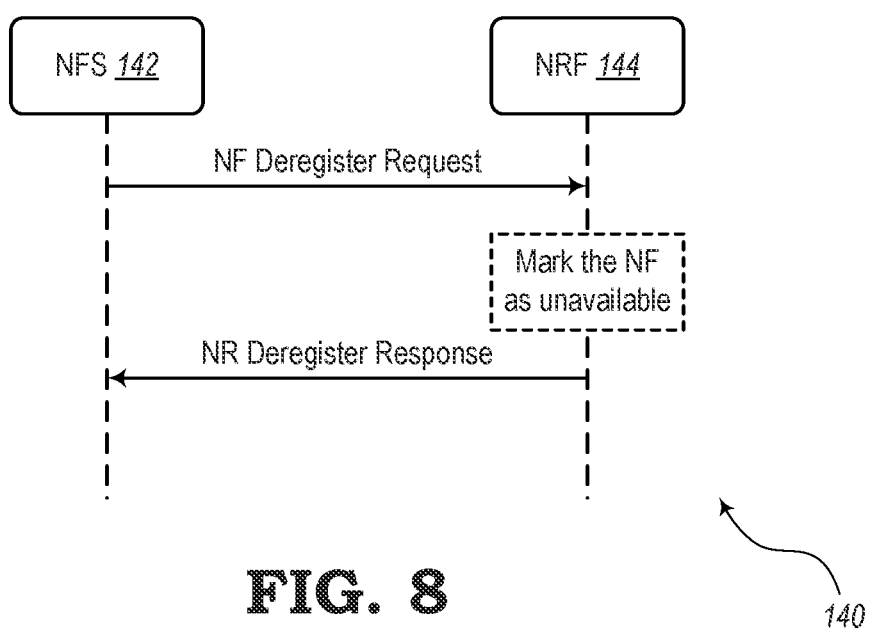
FIG. 8 is a functional chart showing a deregister function using any NF framework of a 5GC, according to some embodiments.

FIG. 8 is a functional chart 140 showing an implementation of a deregister function using any NF framework of a 5GC. In this implementation, the NFS 142 is configured to send an NF_Deregister_Request to the NRF 144. In response, the NRF 144 is configured to mark the NF as unavailable and send an NF_Deregister_Response back to the NFS 142. Thus, in the NF Deregistration process on a 5GC network, the NRF 144 may be responsible for automatic management of all NFs and/or NFS information, including NF deregistration. NF deregistration in this case may be used when an NF is gracefully shut down.

Figure 9:
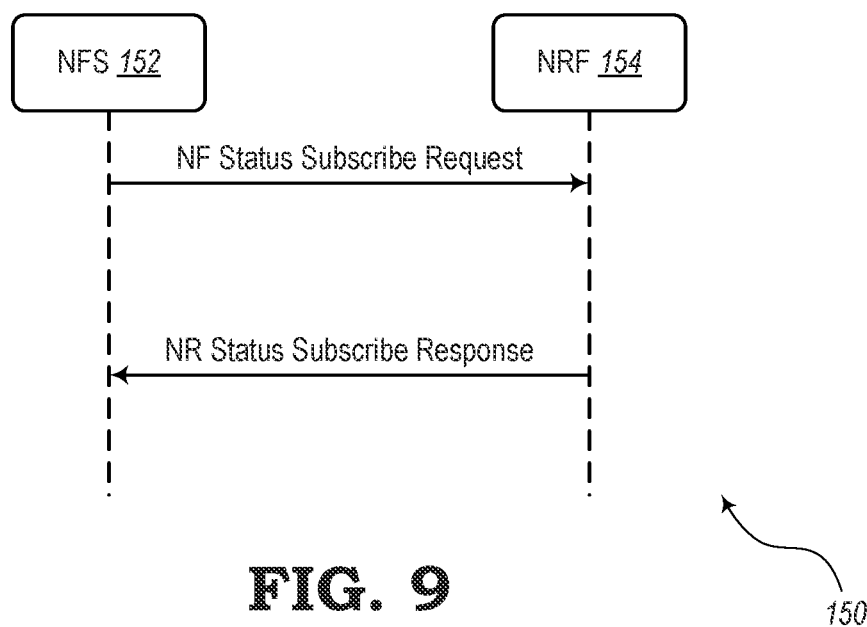
FIG. 9 is a functional chart showing a subscribe function using any NF framework of a 5GC, according to some embodiments.

FIG. 9 is a functional chart 150 showing an implementation of a subscribe function using any NF framework of a 5GC. The NFS 152 sends an NF_Status_Subscribe_Request to the NRF 154. In response, the NRF 154 may perform subscribe steps and send a response back to the NFS 152. In the NF Subscription Notification process on the 5GC network, the NRF 154 may be responsible for automatic management of NFs and NFS information, including NF/NFS subscription information and notifications. The NF status subscription may be used when an NF, expected to be notified of NF/NFS status, changes from the NRF when the subscribed NF/NFS registers with or deregisters from a network. In some implementations, regarding the NF/NFS status updates, the NF can request status notification subscription with the NRF 154. The NF status notification may be used when an NF expects to know the registration, update, or registration changes of other NFs and NFS information and has subscribed to the NF/NFS status changes so that the NRF 154 notifies the NF of the change when the subscribed NF/NFS status changes.

Figure 10:
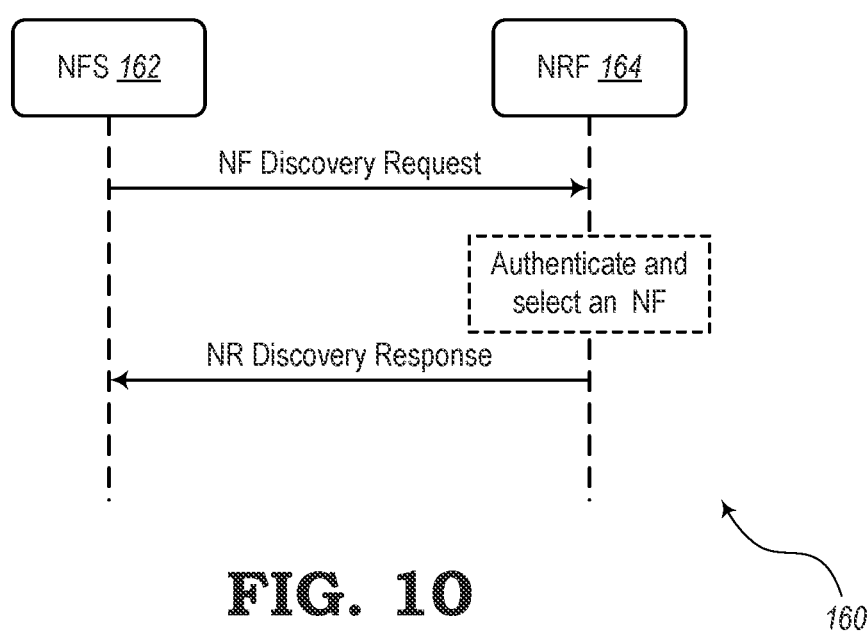
FIG. 10 is a functional chart showing a discovery function using any NF framework of a 5GC, according to some embodiments.

FIG. 10 is a functional chart 160 showing an implementation of a discovery function using any NF framework of a 5GC. In this implementation, the NFS 162 is configured to send a NF_Discovery_Request to the NRF 164. In response, the NRF 164 is configured to authenticate and select an NF and send an NF_Discovery_Response back to the NFS 162. In the NF discovery process on a 5GC network, each NF can use the NRF 164 to search for a proper service producer rather than a fixed peer obtained from local configurations. The NRF 164 is configured to return available service information to the NF for automatic NFS discovery and selection according to the registered NF information.

Regarding NF Token Management, for the sake of security, the NF may be authorized before initiating a service request. This aims to prevent and reduce privilege escalation vulnerabilities. Dynamic token authorization may be used for SBA interfaces between NFs on the 5GC network. The Client Credentials grant may be used for authorization. A token may be used as a short-term token that an NF requests for an invoked service. An NF can invoke the required service only after obtaining the token. After applying for and discovering a service for the first time, the NF applies for an access token from the NRF 164 and uses the token for subsequent service requests. When the access token expires or the requested service changes, the NF can apply for a new access token. In some embodiments, the architecture of the NWDAF 78, 104 may be defined in 3GPP specifications TS 23.288, TS 29.520, etc. The NF reporting may be configured such that each NF within the core will generate various metrics about its current status, functionality, and resources. Samples are described in the tables shown in FIGS. 11 and 12.

FIG. 11 is a table 170 showing analytics available from NFs. FIG. 12 is a table 180 showing data available from NF load analytics. These may be related to 3GPP TS 23.288 V17.3.0 (2021-12).

Figure 13:
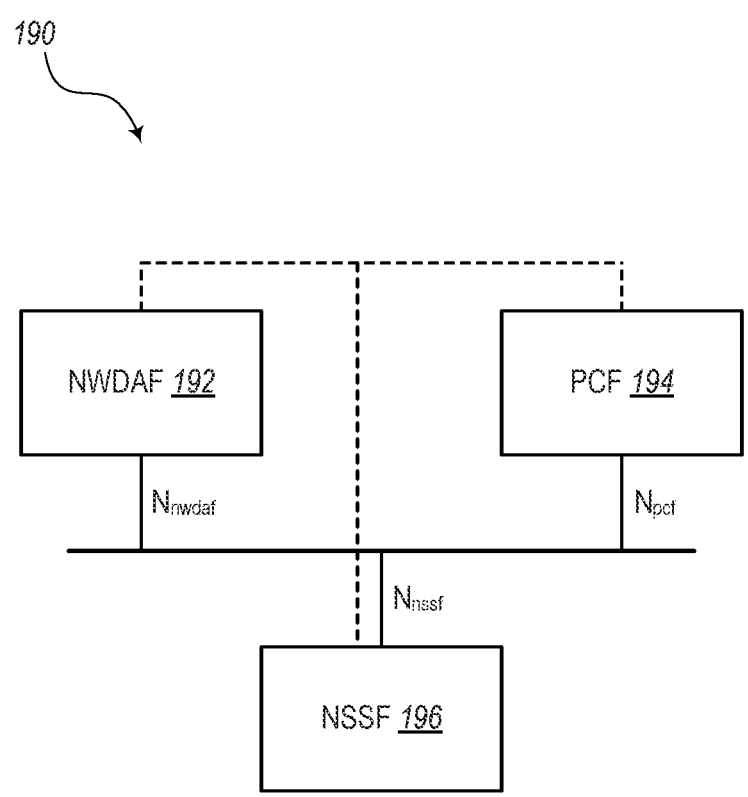
FIG. 13 is a closed-loop automation arrangement of a 5GC, according to some embodiments.

FIG. 13 is diagram illustrating an embodiment of a system 190 including a closed-loop automation arrangement of a 5GC network. The system 190, which has close-loop automation of the core for policy enforcement and slice-selection, includes a NWDAF 192, PCF 194, and NSSF 196, interconnected with each other. The components 192, 194, 196 are configured to provide notifications and publications to each other of load level information on a network slice level. The system 190 includes the data analytics in 3GPP.

The PCF 194 may use analytics (e.g., statistics or predictions) on UE mobility from the NWDAF 192, (e.g., in compliance with TS 23.288) to adjust Service Area Restrictions. The UDM and the PCF 194 may update the Service Area Restrictions of a UE at any time. For the UE in Connection Management—connected (CM-CONNECTED) state, the AMF updates the UE and RAN immediately. For UE in Connection Management—idle (CM-IDLE) state, the AMF may page the UE immediately or store the updated service area restriction and update the UE upon a next signaling interaction with the UE (e.g., as defined in TS 24.501).

The NWDAF 192 may also be configured to perform the following (which is partially similar to standard NWDAF functionality):
a) Load level Computation and Prediction of a Network Slice instance of core NFs;
b) Computational resource consumptions and predications for a core N;
c) Performance degradation and Predications for a core NF or a session;
d) Incoming Traffic and Predications for a core NF;
e) Fault occurrence and Predications for a core NF;
f) Connected user services and Predications for a core NF;
g) Mobility related information and prediction for a group/specific UE;
h) Communication pattern prediction for a specific UE; and
i) Congestion information—Current and Predicted for a specific location.

An HTTP/2 API format for messages, regarding "Type: object," may include, for example:

```
Example data for SMF1: NWDAF Analytics message to NRF
The variable {nfInstanceID} represents an identifier, provided by the NF.
event-id:
Context-ids
nfAnaCtxts: nfInstanceID
nfAnaCtxts: NF_LOAD_LEVEL
 re-context:
contexts: PENDING_ANALYTICS
ana-req:
anaMetaInd:
   dataWindow: {"startTime", "stopTime"}
event-filter:
networkArea: {"plmnId", "mcc", "mnc"}
tgt-nf
identify the target NF information: SMF1
Responses: Code 200
Start time for analytics:
Expiry time for analytics:
timeStampGen:
  anaMetaInfo": {"numSamples"}
  "dataWindow": {"startTime","stopTime"}
nfAnaCtxts": {"nfInstanceID", "string"}
    "anaTypes": {"NF_LOAD_LEVEL", "NF_Resource_Usage"}
"nfLoadLevelInfos": ["nfType": "SMF1","nfInstanceId": "XXXXXXXXX", "nfSetId": "string",
"nfStatus": { "statusRegistered": 100, "statusUnregistered": 100, "statusUndiscoverable":
100},"string"},]
"pendAnalytics": [{"event": "NF_LOAD_LEVEL", "start", "expiry", "timeStampGen",
"failNotifyCode": "UNAVAILABLE_DATA", "rvWaitTime": 0,"anaMetaInfo":
{"numSamples": 0, "dataWindow": {"startTime","stopTime"},
"nfResourceUsage": [
    {"nfType": "SMF1","nfInstanceId","nfSetId": "string", "nfStatus":
{"statusRegistered": 100,"statusUnregistered": 100, "statusUndiscoverable": 100},
    "nfCpuUsage": 0, "nfMemoryUsage": 0,"nfStorageUsage": 0,
"nfLoadLevelAverage": 0,"nfLoadLevelpeak": 0,"snssai": {"sst": 255, "sd": "string"},
    "confidence": 0}],
```

Figure 14:
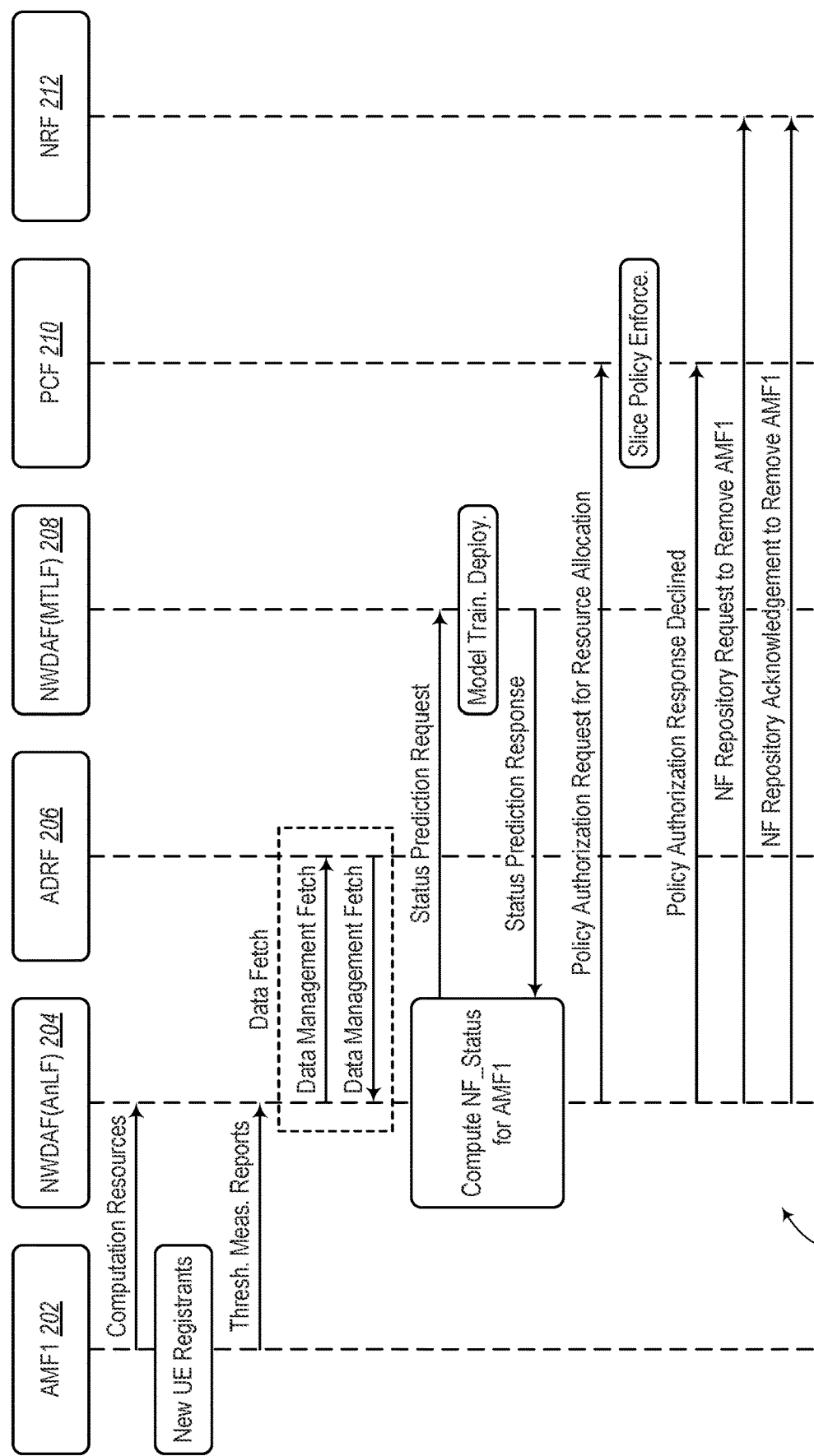
FIG. 14 is a functional chart showing multiple functions using any of the systems of FIGS. 2-4, according to some embodiments.

FIG. 14 is a functional chart 200 showing implementations of multiple functions using any of the systems 20, 40, 100 of FIGS. 2-4. The functional chart 200 includes an Access and mobility Management Function (AMF1) 202, NWDAF (with an Analytics Logic Function (AnLF)) 204, Analytics Data Repository Function (ADRF) 206, NWDAF (with a Model Training Logical Function (MTLF)) 208, Policy Control Function (PCF) 210, and Network Repository Function (NRF) 212.

The AMF1 202 sends computational resources information to the NWDAF(AnLF) 204, enters new UE registrants, and sends threshold measurement reports to the NWDAF (AnLF) 204. In response, the NWDAF(AnLF) 204 may includes a data fetch process, such as by sending a data management fetch request message to the ADRF 206, which, in response, sends a data management fetch response message back to the NWDAF(AnLF) 204. The NWDAF (AnLF) 204 computes the NF status for AMF1 202.

Then, the NWDAF(AnLF) 204 sends an NF status prediction request for AMF1 to the NWDAF(MTLF) 208. In response, the NWDAF(MTLF) 208 trains and deploys a prediction model and sends a status prediction response for the AMF1 back to the NWDAF(AnLF) 204. At this point, the NWDAF(AnLF) 204 sends a policy authorization request for resource allocation to the PCF 210. If declined, the PCF 210 provides slice policy enforcement and sends a policy authorization request declined message back to the NWDAF(AnLF) 204 regarding the resource allocation request. Then, the NWDAF(AnLF) 204 may include sending a repository request (i.e., to remove the AMF1) to the NRF 212. The NRF 212 is configured to make changes in the repository, registry, database, etc.

In the implementation of FIG. 14, the AMF1 202 reports the number of UE registrations. The AMF1 202 notifies the NWDAF(AnLF) 204 that the number of registrants has reached a threshold using, for example,

```
$ref: '#/components/schemas/UERegistrationsThreshold'
```

The NWDAF(AnLF) 204 correlates the report with the resource usage for this specific AMF NF. In some embodiments, the predicted usage of assigned virtual resources for the NF instances (e.g., mean usage of virtual CPU, memory, disk, etc.) as defined in TS 28.552 [8] clause 5.7, belonging to a particular Network Slice instance. Resources for each NF are provided with "ThresholdLevel" that include:

```
ThresholdLevel:
    type: object
    properties:
        congLevel:
            type: integer
```

```
            nfLoadLevel:
                type: integer
            nfCpuUsage:
                type: integer
            nfMemoryUsage:
                type: integer
            nfStorageUsage:
                type: integer
```

The NWDAF analytics engine may be configured to correlate the current data for resource levels with the threshold number of registrations to determine the update the NF status. For example, nfStatus may be $ref: '#/components/schemas/NfStatus'

The NWDAF analytics engine may be configured to determine when there is an alarm for failure. As such, it may trigger two messages:
1) Alert the PCF that this AMF is reaching its threshold levels
   Npcf_BDTPolicyControl.yaml#/components/schemas/NFInfo
2) Trigger the forecasting mode to determine if this NF status could change based on previous historical data
   a) Stages
      i) Stage: fetch ADRF historical data for AMF1
      ii) Stage: data available at NWDAF(ANLF)
      iii) Stage: send all data to NWDAF(MTLF)
      iv) Stage: train data and obtain the predicated time frame for status change for AMF1
   b) NWDAF analytics engine determines the AMF1 to fail (n) events, for example, no resource scalability due to PCF polices
   c) NWDAF analytics notifies the NRF to remove AMF1 from the registry.

The NWDAF's AI shall train various analytics to predict the including session changes e.g., traffic growth. The NWDAF AI could correlate the incoming traffic predications with available computational resources for all NFs serving a session. Finally, the NWDAF would be able to determine the overloaded NFs and exclude them for future service assignments by communicating their identifiers.

Figure 15:
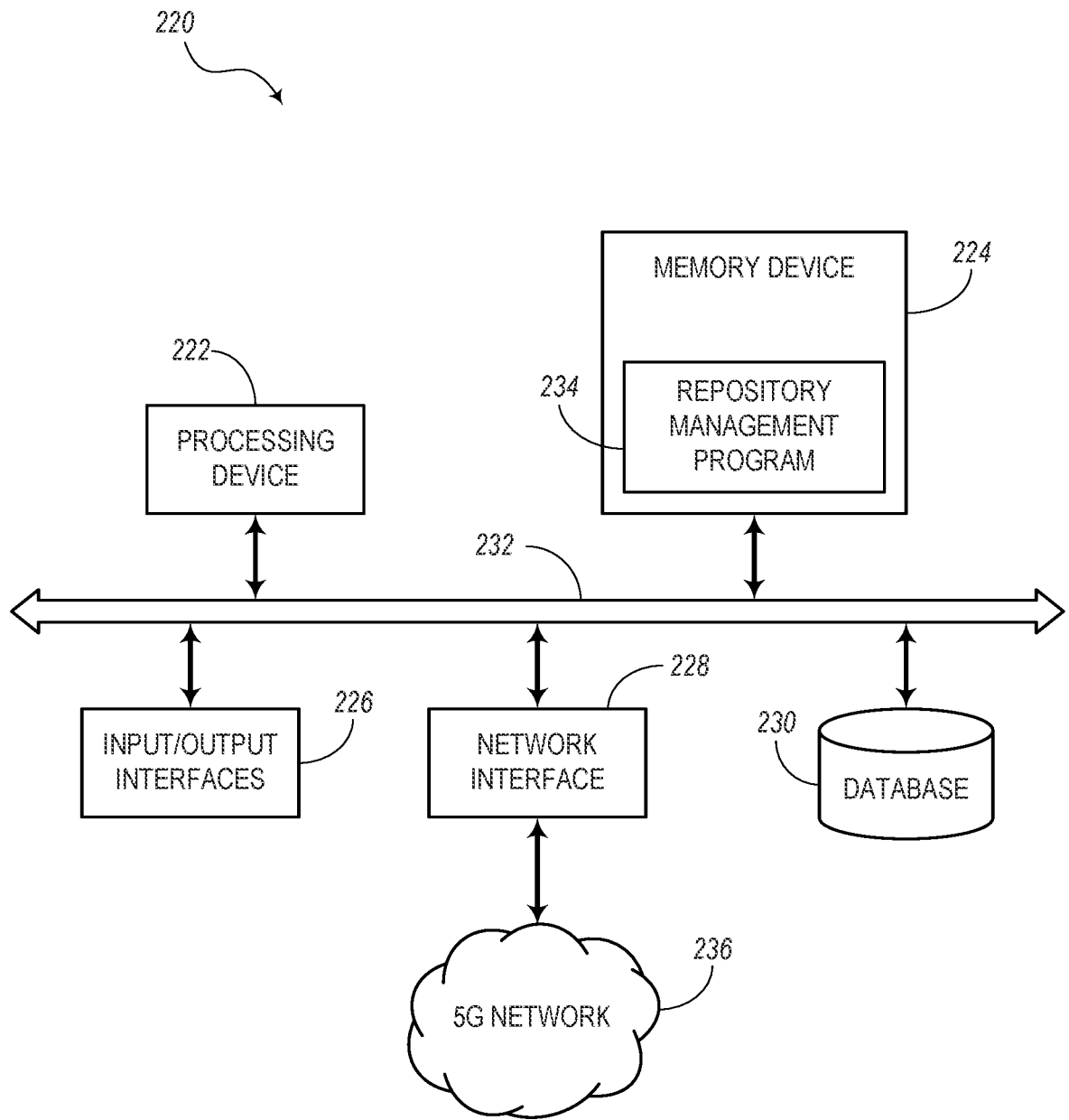
FIG. 15 is a block diagram showing a system for managing NFs in a 5GC framework, according to some embodiments.

FIG. 15 is a block diagram illustrating an embodiment of a management system 220 for managing NFs in a 5GC framework. In the illustrated embodiment, the management system 220 may be a digital computing device that generally includes a processing device 222, a memory device 224, Input/Output (I/O) interfaces 226, a network interface 228, and a database 230. It should be appreciated that FIG. 15 depicts the management system 220 in a simplified manner, where some embodiments may include additional components and suitably configured processing logic to support known or conventional operating features. The components (i.e., 222, 224, 226, 228, 230) may be communicatively coupled via a local interface 232. The local interface 232 may include, for example, one or more buses or other wired or wireless connections. The local interface 232 may also include controllers, buffers, caches, drivers, repeaters, receivers, among other elements, to enable communication. Further, the local interface 232 may include address, control, and/or data connections to enable appropriate communications among the components 222, 224, 226, 228, 230.

It should be appreciated that the processing device 222, according to some embodiments, may include or utilize one or more generic or specialized processors (e.g., microprocessors, CPUs, Digital Signal Processors (DSPs), Network Processors (NPs), Network Processing Units (NPUs), Graphics Processing Units (GPUs), Field Programmable Gate Arrays (FPGAs), semiconductor-based devices, chips, and the like). The processing device 222 may also include or utilize stored program instructions (e.g., stored in hardware, software, and/or firmware) for control of the management system 220 by executing the program instructions to implement some or all of the functions of the systems and methods described herein. Alternatively, some or all functions may be implemented by a state machine that may not necessarily include stored program instructions, may be implemented in one or more Application Specific Integrated Circuits (ASICs), and/or may include functions that can be implemented as custom logic or circuitry. Of course, a combination of the aforementioned approaches may be used. For some of the embodiments described herein, a corresponding device in hardware (and optionally with software, firmware, and combinations thereof) can be referred to as "circuitry" or "logic" that is "configured to" or "adapted to" perform a set of operations, steps, methods, processes, algorithms, functions, techniques, etc., on digital and/or analog signals as described herein with respect to various embodiments.

The memory device 224 may include volatile memory elements (e.g., Random Access Memory (RAM), Dynamic RAM (DRAM), Synchronous DRAM (SDRAM), Static RAM (SRAM), and the like), nonvolatile memory elements (e.g., Read Only Memory (ROM), Programmable ROM (PROM), Erasable PROM (EPROM), Electrically-Erasable PROM (EEPROM), hard drive, tape, Compact Disc ROM (CD-ROM), and the like), or combinations thereof. Moreover, the memory device 224 may incorporate electronic, magnetic, optical, and/or other types of storage media. The memory device 224 may have a distributed architecture, where various components are situated remotely from one another, but can be accessed by the processing device 222.

The memory device 224 may include a data store, database (e.g., database 230), or the like, for storing data. In one example, the data store may be located internal to the management system 220 and may include, for example, an internal hard drive connected to the local interface 232 in the management system 220. Additionally, in another embodiment, the data store may be located external to the management system 220 and may include, for example, an external hard drive connected to the Input/Output (I/O) interfaces 226 (e.g., SCSI or USB connection). In a further embodiment, the data store may be connected to the management system 220 through a network and may include, for example, a network attached file server.

Software stored in the memory device 224 may include one or more programs, each of which may include an ordered listing of executable instructions for implementing logical functions. The software in the memory device 224 may also include a suitable Operating System (O/S) and one or more computer programs. The O/S essentially controls the execution of other computer programs, and provides scheduling, input/output control, file and data management, memory management, and communication control and related services. The computer programs may be configured to implement the various processes, algorithms, methods, techniques, etc. described herein.

Moreover, some embodiments may include non-transitory computer-readable media having instructions stored thereon for programming or enabling a computer, server, processor (e.g., processing device 222), circuit, appliance, device, etc. to perform functions as described herein. Examples of such non-transitory computer-readable medium may include a hard disk, an optical storage device, a magnetic storage device, a ROM, a PROM, an EPROM, an EEPROM, Flash memory, and the like. When stored in the non-transitory computer-readable medium, software can include instructions executable (e.g., by the processing device 222 or other suitable circuitry or logic). For example, when executed, the instructions may cause or enable the processing device 222 to perform a set of operations, steps, methods, processes, algorithms, functions, techniques, etc. as described herein according to various embodiments.

The methods, sequences, steps, techniques, and/or algorithms described in connection with the embodiments disclosed herein may be embodied directly in hardware, in software/firmware modules executed by a processor (e.g., processing device 222), or any suitable combination thereof. Software/firmware modules may reside in the memory device 224, memory controllers, Double Data Rate (DDR) memory, RAM, flash memory, ROM, PROM, EPROM, EEPROM, registers, hard disks, removable disks, CD-ROMs, or any other suitable storage medium.

Those skilled in the pertinent art will appreciate that various embodiments may be described in terms of logical blocks, modules, circuits, algorithms, steps, and sequences of actions, which may be performed or otherwise controlled with a general purpose processor, a DSP, an ASIC, an FPGA, programmable logic devices, discrete gates, transistor logic, discrete hardware components, elements associated with a computing device, controller, state machine, or any suitable combination thereof designed to perform or otherwise control the functions described herein.

The I/O interfaces 226 may be used to receive user input from and/or for providing system output to one or more devices or components. For example, user input may be received via one or more of a keyboard, a keypad, a touchpad, a mouse, and/or other input receiving devices. System outputs may be provided via a display device, monitor, User Interface (UI), Graphical User Interface (GUI), a printer, and/or other user output devices. I/O interfaces 226 may include, for example, one or more of a serial port, a parallel port, a Small Computer System Interface (SCSI), an Internet SCSI (iSCSI), an Advanced Technology Attachment (ATA), a Serial ATA (SATA), a fiber channel, InfiniBand, a Peripheral Component Interconnect (PCI), a PCI eXtended interface (PCI-X), a PCI Express interface (PCIe), an InfraRed (IR) interface, a Radio Frequency (RF) interface, and a Universal Serial Bus (USB) interface.

The network interface 228 may be used to enable the management system 220 to communicate over a network, such as a 5GC network 236, the Internet, a Wide Area Network (WAN), a Local Area Network (LAN), and the like. The network interface 228 may include, for example, an Ethernet card or adapter (e.g., 10BaseT, Fast Ethernet, Gigabit Ethernet, 10 GbE) or a Wireless LAN (WLAN) card or adapter (e.g., 802.11a/b/g/n/ac). The network interface 228 may include address, control, and/or data connections to enable appropriate communications on the 5GC network.

The management system 220 may further include a repository management program 234 configured for managing the NFs stored in the database 230, repository, registry, etc. associated with the 5G network 236. The repository management program 234 may be configured in any suitable combination of hardware (in the processing device 222) and/or software or firmware (in the memory device 224). The repository management program 234 may include logic, computer code, and/or instructions for enabling the processing device 222 to perform certain functions with respect to the management of NFs in the 5G repository. For example, the repository management program 234 may be configured to execute a process similar to the process described below with respect to FIG. 16.

Figure 16:
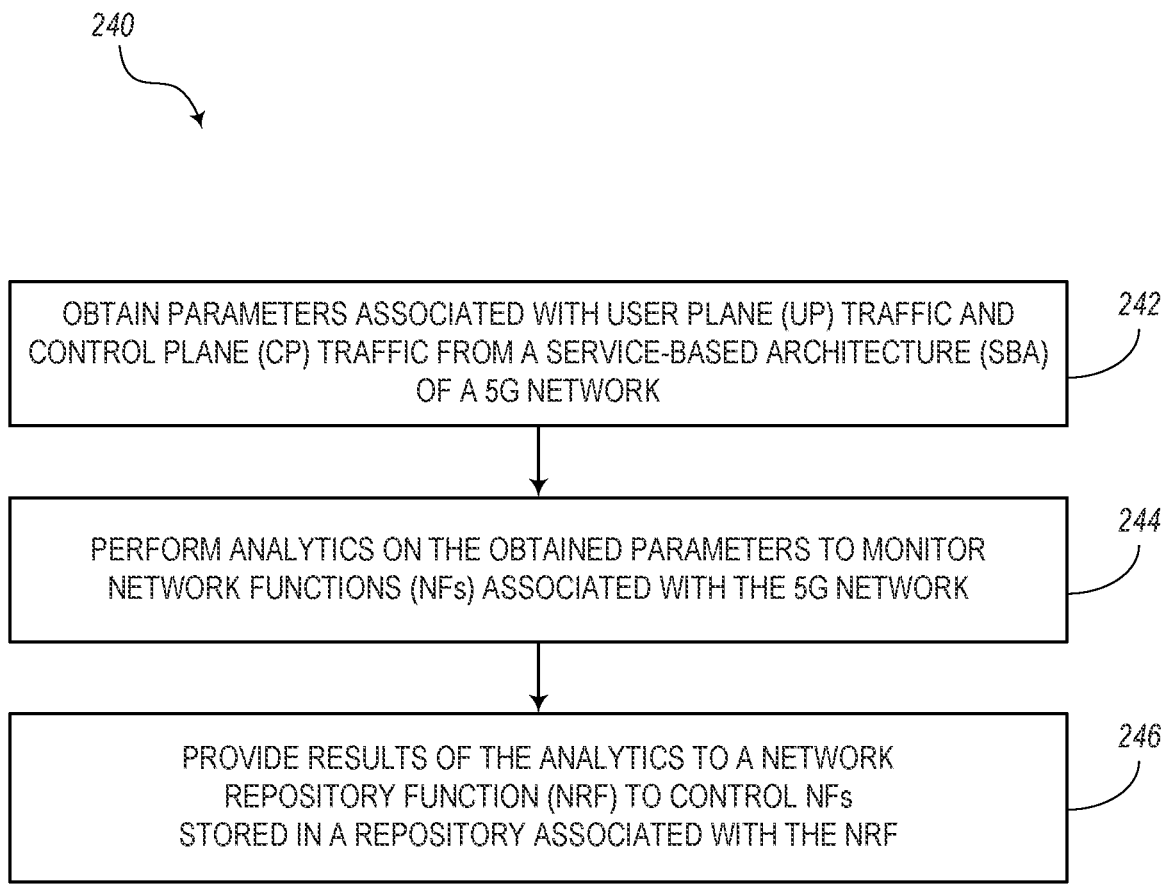
FIG. 16 is a flow diagram showing a process for managing NFs in a repository associated with a 5GC framework, according to some embodiments.

FIG. 16 is a flow diagram illustrating an embodiment of a process 240 for managing NFs in a repository associated with a 5GC framework. As illustrated in the embodiment of FIG. 16, the process 240 includes a step of obtaining parameters associated with User Plane (UP) traffic and Control Plane (CP) traffic from a Service-Based Architecture (SBA) of a 5G network, as indicated in block 242. The process 240 further includes the step of performing analytics on the obtained parameters to monitor Network Functions (NFs) associated with the 5G network, as indicated in block 244. Also, the process 240 includes the step of providing results of the analytics to a Network Repository Function (NRF) to control NFs stored in a repository associated with the NRF, as indicated in block 246. The objective is to obtain parameters associated with User Plane traffic and Control Plane traffic coming from a SBA. Also, this traffic can be collected either with an external User Plane+Control Place passive probe or directly from internal probes/vTap functions integrated into network functions.

According to some embodiments, the process 240 can be further defined as follows. For example, the step of performing analytics (block 244) may be implemented using a Network Data Analytics Function (NWDAF) of the SBA. The process 240, therefore, may further include the step of allowing the NWDAF to communicate an update request to the NRF. The NWDAF, in some embodiments, may be configured to receive input from one or more of a Network Slice Selection Function (NSSF), a Network Exposure Function (NEF), the NRF, a Policy Control Function (PCF), a Unified Data Management (UDM) function, an Application Function (AF), an Authentication Server Function (AUSF), an Access and Mobility management Function (AMF), and a Session Management Function (SMF).

In some embodiments, the step of providing the results to the NRF (block 246) may further include the step of utilizing an interface in a control loop, where the interface, for example, may be positioned between a monitoring tool and the NRF. The process 240 may also include configuring the interface to provide one or more alarms to the NRF regarding a status of one or more NFs in the repository. According to some implementations, the step of obtaining the parameters (block 242) may include the steps of receiving passive results from an UP probe and a CP probe and also receiving native results from an SBA probe of the SBA.

The step of performing analytics (block 244) may include the step of evaluating 5G NF status using Artificial Intelligence (AI). The AI, for example, may be configured to predict errors in one or more NFs in the repository. The process 240 may also include removing one or more faulty or unavailable NFs from the repository.

The systems and methods of the present disclosure are configured to provide a new model for an integrated NWDAF with monitoring solution to improve the management 5G SBA through an interface (e.g., interface 94, 106) that loops back from the monitoring solution engine (e.g., monitoring tool 90, 102) to the 5GC NRF (e.g., NRF 62). The interface 94, 106 is positioned between the NWDAF and the NRF and gathers monitoring information to allow the management of 5G slices through commands to the NRF without additional signaling to external components.

The present disclosure is therefore able to close this control loop and use various alarms about NFs status to update the repository or registry associated with the NRF 62. The interface connects monitoring solutions with NRF. The monitoring engines can improve the automation of 5GC SBA, leverage anomaly detection to the next level by predicting the status of NFs prior to any service assignment, and improve the topology discovery functionality of NRF to meet 5G KPI. From the 5GC perspective, the interface contributes to self-automation of 5GC SBA architecture, improves the service discovery functionality of NRF, reduces the time consumed by 5GC SBA during service assignment, and improves 5GC resiliency against sudden NFs failures.

This disclosure is described focusing on collecting data on the telecom "layer 7" of the network. Those skilled in the are would recognize this could be extended to other data sources coming from lower layer (transport). Indeed, this disclosure is focused on the health of NFs included into the SBA. But other parts of the network could also introduce malfunctions that would require to switch from a NF instance to another one. For example, the backhaul/transport network that is used to connect all those NFs could be the cause of a problem. A failure on a switch or a router could also create issues between 2 NFs of the SBA, thus creating the need to re-route the traffic. In that case, it could be interesting to ingest metrics from those switches and routers to enrich the analytics. We could also correlate with "observability" data that would give us some insights about the virtualization layer.

Although the present disclosure has been illustrated and described herein with reference to various embodiments and examples, it will be readily apparent to those of ordinary skill in the art that other embodiments and examples may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A server comprising:
one or more processors, and
memory configured to store a computer program having instructions that, when executed, enable the one or more processors to
obtain parameters associated with User Plane (UP) traffic and Control Plane (CP) traffic from a Service-Based Architecture (SBA) of a 5G network,
perform analytics on the obtained parameters to monitor Network Functions (NFs) associated with the 5G network, wherein performing analytics includes evaluating 5G NF status using Artificial Intelligence (AI), and wherein AI is configured to predict errors in one or more NFs in a repository, and
provide results of the analytics to a Network Repository Function (NRF) to control NFs stored in the repository associated with the NRF, wherein the control include removing one or more faulty or unavailable NFs from the repository.

2. The management system of claim 1, wherein performing analytics is implemented using a Network Data Analytics Function (NWDAF) of the SBA.

3. The management system of claim 2, wherein the instructions further enable the processing device to allow the NWDAF to communicate an update request to the NRF.

4. The management system of claim 2, wherein the NWDAF is configured to receive input from one or more of a Network Slice Selection Function (NSSF), a Network Exposure Function (NEF), the NRF, a Policy Control Function (PCF), a Unified Data Management (UDM) function, an Application Function (AF), an Authentication Server Function (AUSF), an Access and Mobility management Function (AMF), and a Session Management Function (SMF).

5. The management system of claim 1, wherein providing the results to the NRF includes utilizing an interface in a control loop, the interface positioned between a monitoring tool and the NRF.

6. The management system of claim 5, wherein the instructions further enable the processing device to configure the interface to provide one or more alarms to the NRF regarding a status of one or more NFs in the repository.

7. The management system of claim 1, wherein obtaining the parameters includes receiving passive results from an UP probe and a CP probe and receiving native results from an SBA probe of the SBA.

8. A non-transitory computer-readable medium configured to store computer logic having instructions that, when executed, cause one or more processing devices to:
obtain parameters associated with User Plane (UP) traffic and Control Plane (CP) traffic from a Service-Based Architecture (SBA) of a 5G network;
perform analytics on the obtained parameters to monitor Network Functions (NFs) associated with the 5G network;
provide results of the analytics to a Network Repository Function (NRF) to control NFs stored in a repository associated with the NRF, wherein providing the results to the NRF includes utilizing an interface in a control loop, the interface positioned between a monitoring tool and the NRF; and
configure the interface to provide one or more alarms to the NRF regarding a status of one or more NFs in the repository.

9. The non-transitory computer-readable medium of claim 8, wherein performing analytics is implemented using a Network Data Analytics Function (NWDAF) of the SBA.

10. The non-transitory computer-readable medium of claim 9, wherein the instructions further cause the one or more processing devices to allow the NWDAF to communicate an update request to the NRF.

11. The non-transitory computer-readable medium of claim 9, wherein the NWDAF is configured to receive input from one or more of a Network Slice Selection Function (NSSF), a Network Exposure Function (NEF), the NRF, a Policy Control Function (PCF), a Unified Data Management (UDM) function, an Application Function (AF), an Authentication Server Function (AUSF), an Access and Mobility management Function (AMF), and a Session Management Function (SMF).

12. A method implemented by a processing device associated with a 5G network, the method comprising steps of:
obtaining parameters associated with User Plane (UP) traffic and Control Plane (CP) traffic from a Service-Based Architecture (SBA) of the 5G network;
performing analytics on the obtained parameters to monitor Network Functions (NFs) associated with the 5G network;
providing results of the analytics to a Network Repository Function (NRF) to control NFs stored in a repository associated with the NRF, wherein providing the results to the NRF includes utilizing an interface in a control loop, the interface positioned between a monitoring tool and the NRF; and configuring the interface to provide one or more alarms to the NRF regarding a status of one or more NFs in the repository.

13. The method of claim 12, wherein the step of obtaining the parameters includes the steps of receiving passive results from an UP probe and a CP probe and receiving native results from an SBA probe of the SBA.

14. The method of claim 12, wherein the step of performing analytics includes the step of evaluating 5G NF status using Artificial Intelligence (AI).

15. The method of claim 14, wherein the AI is configured to predict errors in one or more NFs in the repository.

16. The method of claim 15, further comprising the step of removing one or more faulty or unavailable NFs from the repository.

\* \* \* \* \*